(12) United States Patent
Hayakawa et al.

(10) Patent No.: US 9,137,409 B2
(45) Date of Patent: Sep. 15, 2015

(54) ELECTRONIC APPARATUS AND IMAGE FORMING APPARATUS

(71) Applicant: OKI DATA CORPORATION, Tokyo (JP)

(72) Inventors: Yoichi Hayakawa, Tokyo (JP); Masahiro Sonoda, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 268 days.

(21) Appl. No.: 13/687,433

(22) Filed: Nov. 28, 2012

(65) Prior Publication Data

US 2013/0135681 A1     May 30, 2013

(30) Foreign Application Priority Data

Nov. 29, 2011   (JP) .................................. 2011-260445

(51) Int. Cl.
| | |
|---|---|
| G03G 15/00 | (2006.01) |
| H04N 1/00 | (2006.01) |
| G03G 15/08 | (2006.01) |
| G03G 21/18 | (2006.01) |

(52) U.S. Cl.
CPC ....... *H04N 1/00925* (2013.01); *G03G 15/0863* (2013.01); *G03G 15/553* (2013.01); *G03G 21/1889* (2013.01); *H04N 1/00832* (2013.01)

(58) Field of Classification Search
CPC ............ G03G 15/553; G03G 15/0863; G03G 21/1889
USPC ............................ 399/12, 13, 24–26, 43, 46
See application file for complete search history.

(56) References Cited

U.S. PATENT DOCUMENTS

2006/0045549 A1*   3/2006   Ahn ................................ 399/25

FOREIGN PATENT DOCUMENTS

JP     2009-175231 A     8/2009

* cited by examiner

*Primary Examiner* — Walter L Lindsay, Jr.
*Assistant Examiner* — Jessica L Eley
(74) *Attorney, Agent, or Firm* — Rabin & Berdo, P.C.

(57) ABSTRACT

One of two replaceable components is selectively detachably attached to an apparatus. A first component includes first information that includes first lifetime indicative of a lifetime of the first component and is used for managing usage of the first component. A second component includes second information for managing usage of the second component. A controller determines, based on one of the first and second lifetimes, whether the apparatus should operate. The controller drives the apparatus to operate based on the first lifetime if a read/write section successfully reads the first lifetime from one of the first and second components that has been attached to the apparatus. The controller drives the apparatus to operate based on the second lifetime if the read/write section fails to read the first lifetime from one of the first and second components that has been attached to the apparatus.

10 Claims, 9 Drawing Sheets

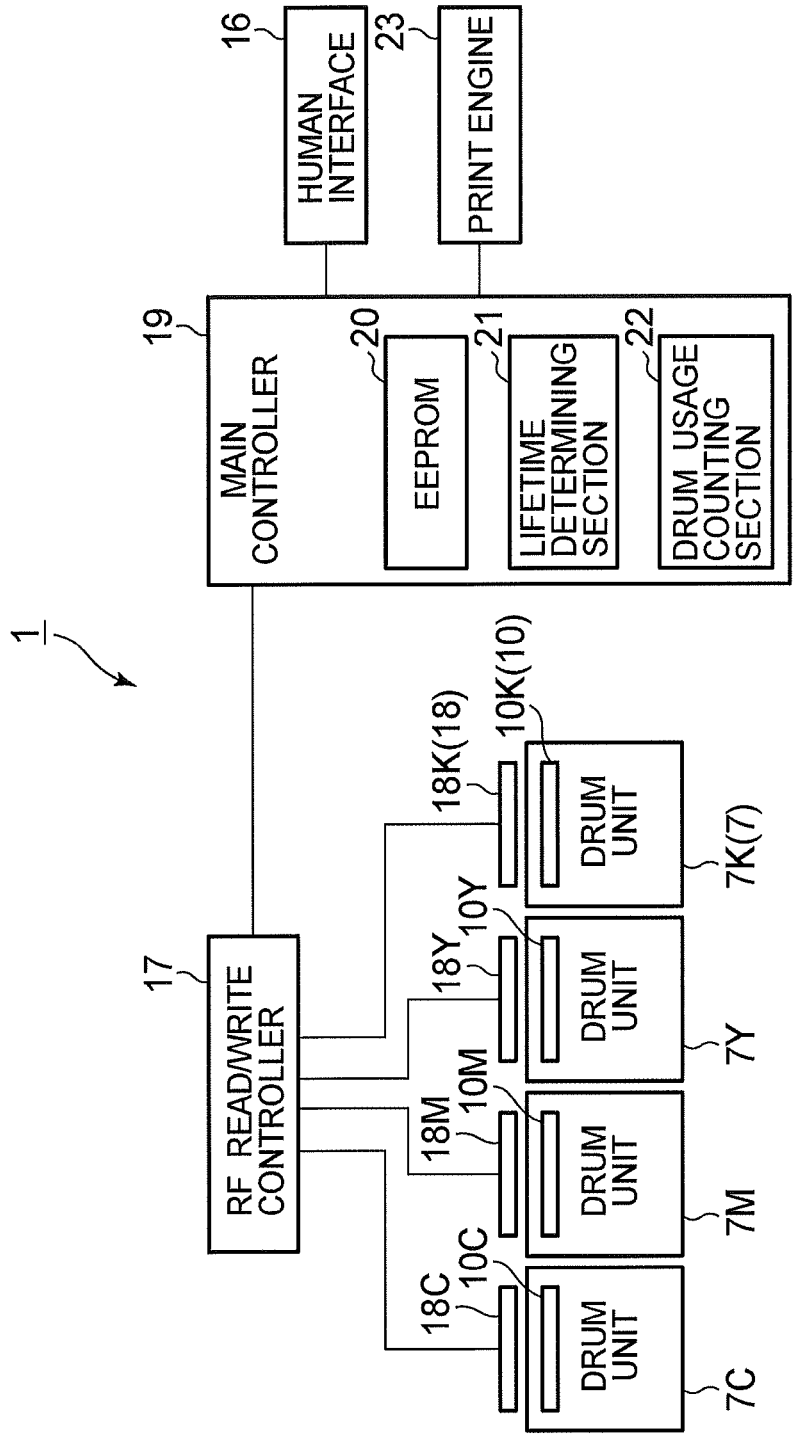

FIG.3A

⟨MEMORY TAG 10a: GENERAL PURPOSE TYPE⟩

| DESTINATION |
|---|
| NO LIFETIME |
| NUMBER OF DRUM ROTATIONS |

| END-OF-LIFETIME OF DRUM |
|---|
| COLOR INFORMATION |

FIG.3B

⟨MEMORY TAG 10b: LONG LIFETIME TYPE⟩

| DESTINATION |
|---|
| LIFETIME(50K) |
| NUMBER OF DRUM ROTATIONS |

| END-OF-LIFETIME OF DRUM |
|---|
| COLOR INFORMATION |

FIG.3C

⟨EEPROM 20⟩

| DESTINATION |
|---|
| LIFETIME(30K OR 15K) |
| NUMBER OF DRUM ROTATIONS |

| TYPE INFORMATION "1" OR "0" |
|---|
| A VARIETY OF ITEMS OF INFORMATION |

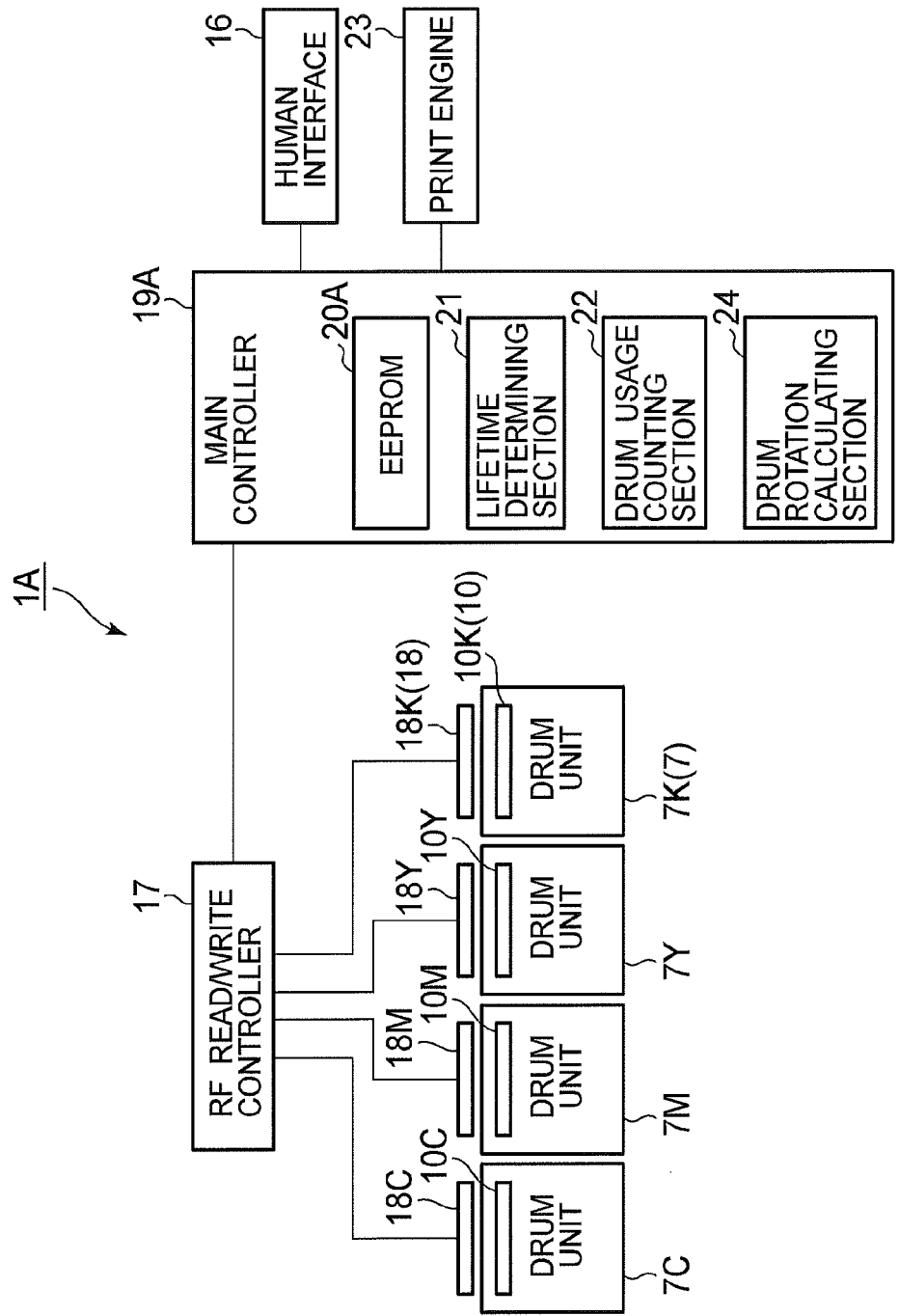

FIG.6A
⟨MEMORY TAG 10a: GENERAL PURPOSE TYPE⟩
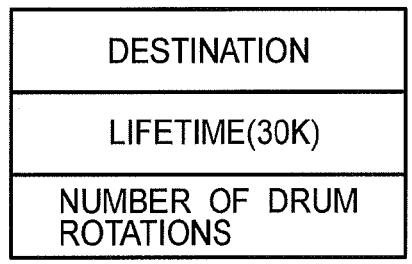
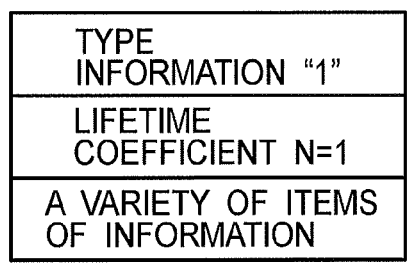
FIG.6B
⟨MEMORY TAG 10b: LONG LIFETIME TYPE⟩
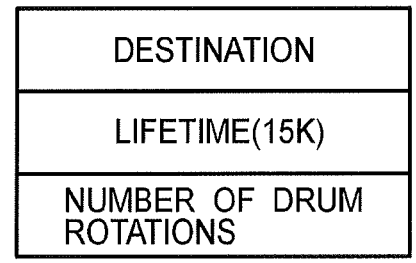
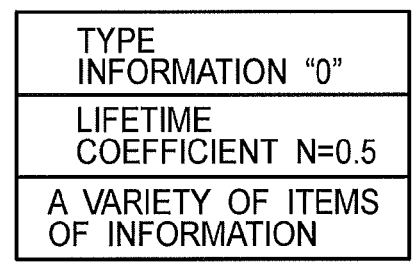

ELECTRONIC APPARATUS AND IMAGE FORMING APPARATUS

BACKGROUND OF THE INVENTION

1. Field of the Invention

The present invention relates to an electronic apparatus and an image forming apparatus, and more particularly to a technology that facilitates management of replaceable parts with different lifetimes.

2. Description of the Related Art

Existing image forming apparatuses including copying machines, facsimile machines, and printers incorporate replaceable parts detachably attached to the body of the image forming apparatus. The replaceable parts include, for example, print engines and developer material cartridges attached to the print engine of the image forming apparatus. The developer material cartridges have a relatively short lifetime and supplies developer materials to the corresponding print engines. Each replaceable part incorporates a memory tag as a memory that stores items of information about a corresponding print engine, the lifetime of a corresponding developer material cartridge, or the type of the replaceable part.

The memory tag is checked to determine whether the replaceable part is acceptable to the image forming apparatus. If the replaceable part is not acceptable, then an alarm section indicates to the user that the replaceable part is not acceptable. Especially, a particular value of lifetime is selected at the time of design for ensuring printed image quality, and the image forming apparatus makes a decision to determine whether the replaceable part has reached the end of its usable lifetime, before the replaceable part is actually replaced.

Conventional electronic apparatuses including an image forming apparatus suffer from the following drawbacks.

Some users may want to print, even with a somewhat deteriorated print quality, a number of pages exceeding a predetermined maximum number of pages below which printing can be performed with good print quality.

The lifetime of a print engine varies depending on the operating conditions including the type of paper on which the print engine prints. In other words, the number of pages that can be printed with good print quality varies depending on the operating conditions, and therefore the lifetime of the print engine needs to be managed according to the operating conditions.

Replaceable parts including print engines, developer material cartridges, and the like usually have different lifetimes. Therefore, the lifetime of replaceable parts needs to be managed on the basis of the number of combinations of the replaceable parts, the lifetime of the replaceable parts, and the operating conditions under which the replaceable parts operate. This, however, leads to complicated management of replaceable parts.

SUMMARY OF THE INVENTION

The present invention was made in view of the aforementioned drawbacks.

An object of the invention is to provide an electronic apparatus, an image forming apparatus and a replaceable part managing system that facilitate management of replaceable parts according to combinations of the replaceable parts having different lifetimes and the conditions of usage of the replaceable parts that affect the useable lifetimes of the replaceable parts.

An electronic apparatus includes a body and replaceable components detachably attached to the body. One of a first replaceable component and a second replaceable component is selectively detachably attached to the body. The first replaceable component includes first management information for managing usage of the first replaceable component. The first management information includes at least a first item of lifetime information indicative of a lifetime of the first replaceable component. The second replaceable component includes second management information for managing usage of the second replaceable component. A memory stores a second item of lifetime information. An information read/write section is configured to read the first item of lifetime information from one of the first replaceable component and the second replaceable component that has been attached to the body. A controller is configured to make a decision to determine whether the electronic apparatus should operate, the decision being made based on one of the first item of lifetime information and the second item of lifetime information. The controller drives the electronic apparatus to operate based on the first item of lifetime information if the read/write section successfully reads the first item of lifetime information from one of the first replaceable component and the second replaceable component that has been attached to the body. The controller drives the electronic apparatus to operate based on the second item of lifetime information if the read/write section fails to read the first item of lifetime information from one of the first replaceable component and the second replaceable component that has been attached to the body.

A replaceable component configured to be detachably attached to an apparatus, includes a memory tag. The memory tag includes a lifetime storing area defined in the memory tag and storing an item of lifetime information of the replaceable component, and a usage history storing area defined in the memory tag and storing an item of usage information. When the apparatus fails to read the item of lifetime information from the lifetime storing area, the apparatus writes a first item of usage information into the usage history storing area. When the apparatus successfully reads the item of lifetime information from the lifetime storing area, the apparatus writes a second item of usage information into the usage history storing area.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 2 is a block diagram illustrating the configuration of the image forming apparatus shown in FIG. 1;

FIGS. 3A-3C illustrate examples of items of information stored in the memory tags and EEPROM;

FIG. 5 is a block diagram illustrating the outline of an image forming apparatus according to a second embodiment;

FIG. 6A illustrates an example of information held in the EEPROM when ordinary paper is used;

FIG. 6B illustrates an example of information held in the EEPROM when special paper is used.

DETAILED DESCRIPTION OF THE INVENTION

Figure 1:
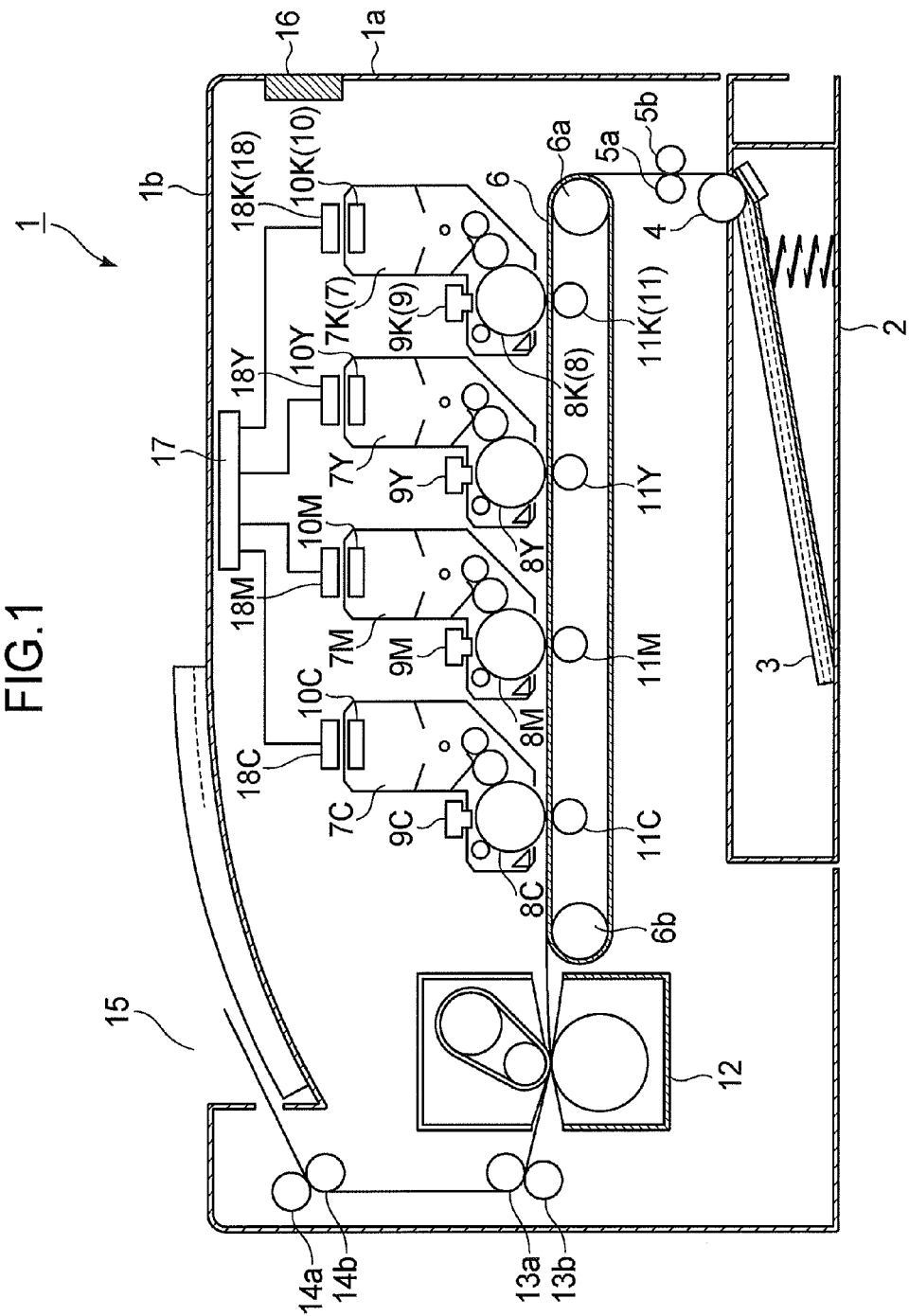
FIG. 1 is a cross-sectional view of an image forming apparatus according to a first embodiment of the invention.

The present invention will be described in detail with reference to the accompanying drawings. It will be understood that it is not intended to limit the invention to the drawings.
First Embodiment
{Configuration}
FIG. 1 is a cross-sectional view of an image forming apparatus 1 according to a first embodiment of the invention.

The image forming apparatus 1 is, for example, a color printer that prints a color image on a recording medium 3, e.g., paper, and includes a chassis 1a and a top cover 1b configured to open and close relative to the chassis 1a.

A medium holding section 2, which holds a stack of recording medium 3 therein, is located at a lower portion of the image forming apparatus 1. A feed roller 4 is disposed at the medium holding section 2 closer to a pair of registry rollers 5a and 5b, and feeds the recording medium 3 on a sheet-by-sheet basis towards the registry rollers 5a and 5b, which in turn transport the recording medium 3 to a transport belt 6. The transport belt 6 is disposed about a drive roller 6a and a driven roller 6b, and is driven to run in such a direction as to transport the recording medium 3 from upstream to downstream of a transport path. A plurality of drum units 7K, 7Y, 7M, and 7C as print engines are located over the transport belt 6 along the transport path. Each drum unit incorporates a photoconductive drum whose surface is covered with a photoconductive material.

The drum units 7K, 7Y, 7M, and 7C includes a black drum unit 7K, a yellow drum unit 7Y, a magenta drum unit 7M, and a cyan drum unit 7C, which are all replaceable components. Each drum unit functions as a developing unit, and includes a toner cartridge as a developer material cartridge detachably attached thereto. The drum units are detachably attached to the image forming apparatus 1. The drum units 7K, 7Y, 7M, and 7C each include a black photoconductive drum 8K, a yellow photoconductive drum 8Y, a magenta photoconductive drum 8M, and a cyan photoconductive drum 8C. The photoconductive drums 7K, 7Y, 7M, and 7C receive high voltages from high voltage power supplies (not shown) so that the surface of the photoconductive drum is charged to a high potential. The drum units 7K, 7Y, 7M, and 7C also include a black LED (light emitting diode) head 9K, a yellow LED head 9Y, a magenta LED head 9M, and a cyan LED head 9C, respectively.

A black transfer roller 11K, a yellow transfer roller 11Y, a magenta transfer roller 11M, and a cyan transfer roller 11C face the photoconductive drums 8K, 8Y, 8M, and 8C, respectively, and are disposed with the transport belt 6 sandwiched between the transfer belt 6 and the respective photoconductive drums 8K, 8Y, 8M, and 8C. Each transfer roller transfers a toner image of a corresponding color onto the recording medium 3.

Each of the LED heads 9K, 9Y, 9M, and 9C is attached to a corresponding holder detachably mounted on the top cover 1b. The LED heads receive the print data from another section of the image forming apparatus 1 via cables. Upon reception of print data, each LED head illuminates the charged surface of a corresponding one of the photoconductive drums 8K, 8Y, 8M, and 8C. The high voltage power supply, LED head, photoconductive drum, and transfer roller cooperate with one another to perform an electrophotographic process: charging the surface of the photoconductive drum, forming an electrostatic latent image on the charged surface of the photoconductive drum, developing the electrostatic latent image into a toner image, and transferring the toner image onto the recording medium 3.

Once the top cover 1b has been closed, the LED heads are positioned very close to the charged surfaces of the corresponding photoconductive drums, so that the LED heads are ready to illuminate the charged surfaces to form an electrostatic latent image.

A black memory tag 10K, yellow memory tag 10Y, magenta memory tag 10M, and cyan memory tag 10C are attached to the upper portions of the corresponding drum units 7K, 7Y, 7M, and 7C, respectively. Each memory tag includes a tag chip that incorporates a non-volatile memory therein and a board having an antenna pattern formed thereon, and is attached to the upper portion of the drum unit. Each memory tag stores management information for a corresponding drum unit.

A fixing section 12 is located immediately downstream of the transport belt 6, and fixes the toner image on the recording medium 3 by heat and pressure when the recording medium 3 passes through a fixing point defined in the fixing section 12. A pair of discharge rollers 13a and 13b and a pair of another discharger rollers 14a and 14b are located downstream of the fixing section 12, and cooperate with each other to discharge the recording medium 3 onto a stacker 15 after fixing.

A human interface 16 is disposed on a side surface of the image forming apparatus 1, and is connected to the main controller (not shown) via a cable. The human interface 16 includes a circuit board on which a liquid crystal display and a variety of switches are mounted. The human interface 16 displays the status of the image forming apparatus, and receives commands from a user. The liquid display is a panel display having a screen of a 24 by 2 matrix for displaying characters, i.e., 2 rows each of which has 24 characters.

The image forming apparatus 1 incorporates an RF read/write controller 17 therein which controls read/write operations of the management information of the memory tag 10. The RF read/write controller 17 communicates with a black antenna section 18K, yellow antenna section 18Y, a magenta antenna section 18M, and a cyan antenna section 18C located in the vicinity of the respective memory tags, via high frequency cables.

FIG. 2 is a block diagram illustrating the configuration of the image forming apparatus shown in FIG. 1.

The RF read/write controller 17 supplies electric power to the memory tags via the antenna sections, and controls the read/write operations of the information into and out of the respective memory chips. The RF read/write controller 17 also communicates with a main controller 19 via a signal line.

The main controller 19 performs the overall control of the image forming apparatus 1 under control of a control program.

The main controller 19 includes a non-volatile memory, e.g., electrically erasable programmable ROM (EEPROM) 20, a lifetime determining section 21 and a drum usage counting section 22. The RRPROM 20 stores a variety of items of management information required for controlling the image forming apparatus 1. The lifetime determining section 21 reads the items of management information from the memory tag and the EEPROM 20, and then compares them, thereby selecting an appropriate lifetime management of the drum unit based on the comparison results. The drum usage counting section 22 counts the number of rotations of the drum unit when the drum is driven in rotation during a printing operation and a correction operation.

The main controller 19 communicates with the human interface 16 and a print engine 23 via an input/output port. The print engine 23 includes actuators (not shown) for transporting and discharging the recording medium 3, sensors that detect a variety of statuses of the image forming apparatus 1, a high voltage power supply, and performs a variety of functions including temperature control of the fixing section 12.

Referring to FIG. 2, a replaceable component management system includes the drum units 7K, 7Y, 7M, and 7C, memory tags 10K, 10Y, 10M, and 10C, and RF read/write controller 17. The RF read/write controller 17 includes the antenna sections 18K, 18Y, 18M, and 18C, and a main controller 19. The main controller 19 includes the EEPROM 20, the lifetime determining section 21, and the drum usage counting section 22.

FIGS. 3A-3C illustrate examples of items of information stored in the memory tags 10a and 10b and EEPROM 20. FIG. 3A illustrates exemplary items of information stored in the memory tag 10a of a general purpose drum unit. FIG. 3B illustrates exemplary items of information stored in the memory tag 10b of a long lifetime drum unit. FIG. 3C illustrates exemplary items of information stored in the EEPROM 20.

The memory tags 10a and 10b store, for example, destination information, maximum lifetime, the number of drum rotations, the end-of-lifetime of drum, and color information. The destination information specifies the destination of drum unit: domestic market, foreign market, and the like. The maximum lifetime is a value or reference value used for determining whether the drum unit has reached the end of its usable lifetime. The maximum lifetime is expressed in terms of the maximum cumulative number of printed pages when printing is performed on recording media (e.g., A4 size paper). The drum unit can be used up to the maximum lifetime with good print quality, and cannot be used beyond this reference value with good print quality. The memory tag is of two types: the memory tag 10a for the general purpose drum unit and the memory tag 10b for the long lifetime drum unit. The memory tag 10a does not store the maximum lifetime information therein.

The number of drum rotations represents an actual cumulative usage of the drum unit, e.g., the cumulative number of printed A4 size recording medium. The drum usage counting section 22 counts the cumulative number of printed pages every time printing is performed, so that the values of the maximum lifetime held in the memory tag 10b and EEPROM 20 are updated. The end-of-lifetime of the drum held in the memory tags 10a and 10b is set to "1" when the cumulative usage of the drum unit exceeds a value or the number, i.e., the number of printed pages below which a good print quality is ensured. The color information indicates the colors of developer material: black (K), yellow (Y), magenta (M), and cyan (C).

The EEPROM 18 stores a variety of items of information including the destination information, the maximum lifetime, the number of drum rotations, and type information. The type information is used to determine whether the image forming apparatus 1 accepts the long lifetime drum unit. The type n information "0" indicates that the image forming apparatus 1 accepts only the general purpose drum unit. The type information "1" indicates that the image forming apparatus 1 accepts either of the general purpose drum unit and the long lifetime drum unit. The items of information stored in the EEPROM 18 are used in activating the printing operation of the image forming apparatus 1.

{Operation}

A description will be given of the overall operation of the image forming apparatus 1.

Referring to FIGS. 1 and 2, the image forming apparatus 1 receives print data written in a page description language (PDL) from external equipment (not shown) via a host interface. The received print data is then rendered into bit map data (image data) before being sent to the print engine 23.

When a user commands to print from the human interface 16, the main controller 19 drives the print engine 23 to initiate printing.

The feed roller 4 feeds the recording medium 3 held in the medium holding section 2 into the transport path. The recording medium 3 is then transported by the registry rollers 5a and 5b onto the transport belt 6 in timed relationship with electrophotographic image formation. Toner images of the respective colors are formed on the photoconductive drums 8K, 8Y, 8M, and 8C of the drum units 7K, 7Y, 7M, and 7C, respectively, by an electrophotographic image forming process. Specifically, the LED head 9K, 9Y, 9M, and 9C illuminate the charged surfaces of the photoconductive drums 8K, 8Y, 8M, and 8C in accordance with the bit map data for corresponding colors, thereby forming electrostatic latent images for the respective colors on the surfaces of the corresponding photoconductive drums 8K, 8Y, 8M. The electrostatic latent images are developed with toners of corresponding colors into toner images. The transfer rollers 11K, 11Y, 11M, and 11C receive high d-c voltages from corresponding power supplies (not shown) so that the toner image is transferred onto the recording medium with the aid of a high electric field between the photoconductive drum and the transfer roller. The respective toner images are transferred onto the recording medium 3 one over the other in registration. The recording medium 3 is then fed into the fixing section 12 so that a full-color toner image is fixed into a permanent image. The recording medium 3 is then transported by the pair of discharge rollers 13a and 13b and another pair of discharge rollers and 14a and 14b onto the stacker 15.

A description will now be given of the initial operation of the image forming apparatus 1 after power-up.

Upon power-up, a check is made to determine whether the drum units 7K, 7Y, 7M, and 7C are acceptable to the image forming apparatus 1. If any one of the drum units 7K, 7Y, 7M, and 7C is not accepted, the human interface 16 indicates to the user that one of the drum units 7K, 7Y, 7M, and 7C is not accepted. If all of the drum units 7K, 7Y, 7M, and 7C are accepted, the image forming apparatus 1 enters the overall operation described above.

The main controller 19 reads the destination information from the memory tags 10 mounted on the respective drum units 7K, 7Y, 7M, and 7C and the destination information from the RRPROM 20 in the main controller 19, and then makes a decision whether these two items of destination information are coincident. If they are coincident, then the operation continues. If they are not coincident, then the human interface 16 indicates to the user that the two items of destination information are not coincident. FIGS. 3A-3C show an example of the destination information as a part of stored information. If the items of destination information held in the drum units 7K, 7Y, 7M, and 7C and those held in the EEPROM 20 are coincident, the lifetime determining section 21 reads the maximum lifetime held in the memory tag 10 and the maximum lifetime held in the EEPROM 20.

The maximum lifetime is a reference value used for determining whether the drum unit has reached the end of its usable lifetime. For example, the maximum lifetime is expressed in terms of the cumulative number of printed pages, e.g., 30,000 pages, when continuous printing is performed on an A4 size recording medium (e.g., A4 size ordinary paper). The drum unit can be used up to this value with good print quality, and cannot be used beyond this reference value which good print quality. The lifetime determining section 21 in the main controller 19 determines whether the drum unit has reached the end of its usable lifetime. The drum usage counting section 22 counts the number of rotations of the drum unit driven in rotation, the counted number of rotations being used to update the number of drum rotations held in the memory tags 10 and EEPEROM 20. The number of drum rotations indicates an actual usage of the drum unit, and is expressed in terms of the number of printed, for example, A4 size paper. Once a new, unused drum unit has been attached to the image forming apparatus 1, the number of drum rotations held in the EEPROM 20 is erased.

The main controller 19 reads the number of drum rotations from each memory tag 10, and makes a decision to determine whether the number of drum rotations has exceeded the maximum lifetime of 30,000 pages. A particular value of lifetime is selected at the time of design for ensuring a good image quality. The value is, for example, 30,000 pages irrespective of where the replaceable component is destined, and is stored in the EEPROM 20.

However, the image forming apparatus 1 is used in a variety of ways. Some users may want to print as many pages as possible even at the cost of poor print quality. In order to address such user's demand, a few types of drum units are available so that the user can select according to the manner in which the replaceable component is used. The types of drum units include, for example, a general purpose drum unit, and a long lifetime drum unit. The memory tag 10a for the general purpose drum unit does not hold the lifetime information. The memory tag 10b for the long lifetime drum unit holds the maximum lifetime of, for example, 50000 pages (see FIGS. 3B) for the ordinary paper.

The general purpose drum units 7K, 7Y, 7M, and 7C each have the memory tag 10a that does not hold the maximum lifetime therein. Thus, if the general purpose drum units 7K, 7Y, 7M, and 7C have been attached to the image forming apparatus 1, the maximum lifetime is not read from the memory tags 10a. Instead, the lifetime is managed based on the lifetime of 30,000 pages stored in the EEPROM 20. If the long lifetime drum units have been attached to the image forming apparatus 1, then the lifetimes is managed based on the lifetime of 50,000 pages.

A print medium having a rough surface tends to damage the surface of the photoconductive drum. Therefore, the users who use such a print medium are restricted in the maximum lifetime, and the EEPROM 20 holds a shorter maximum lifetime, e.g., 15,000 pages for ordinary paper, so that the lifetime of the drum unit is managed based on the maximum lifetime of 15,000 pages. The maximum lifetime is set according to destination.

If the long lifetime drum unit is used, the maximum lifetime of 50,000 pages is read from the memory tag 10b of the long lifetime drum unit, so that the lifetime is managed based on the maximum lifetime of 50,000 pages for both ordinary paper and special paper having a rougher surface than the ordinary paper. This may cause damage to the photoconductive drum of the long lifetime drum unit if printing is performed more often on the special paper than on the ordinary paper. In order to address this problem, the EEPROM 20 holds the type information therein, the content of the type information "0" indicating the general purpose drum unit and the content of the type information "1" indicating the long lifetime drum unit. The main controller 19 makes a decision to determine whether the image forming apparatus accepts the general purpose drum unit or the long lifetime drum unit. If the type information is "0," the image forming apparatus 1 accepts the general purpose drum unit only. If the type information is "1," the image forming apparatus 1 accepts either of the general purpose drum unit and the long lifetime drum unit.

Figure 4A:
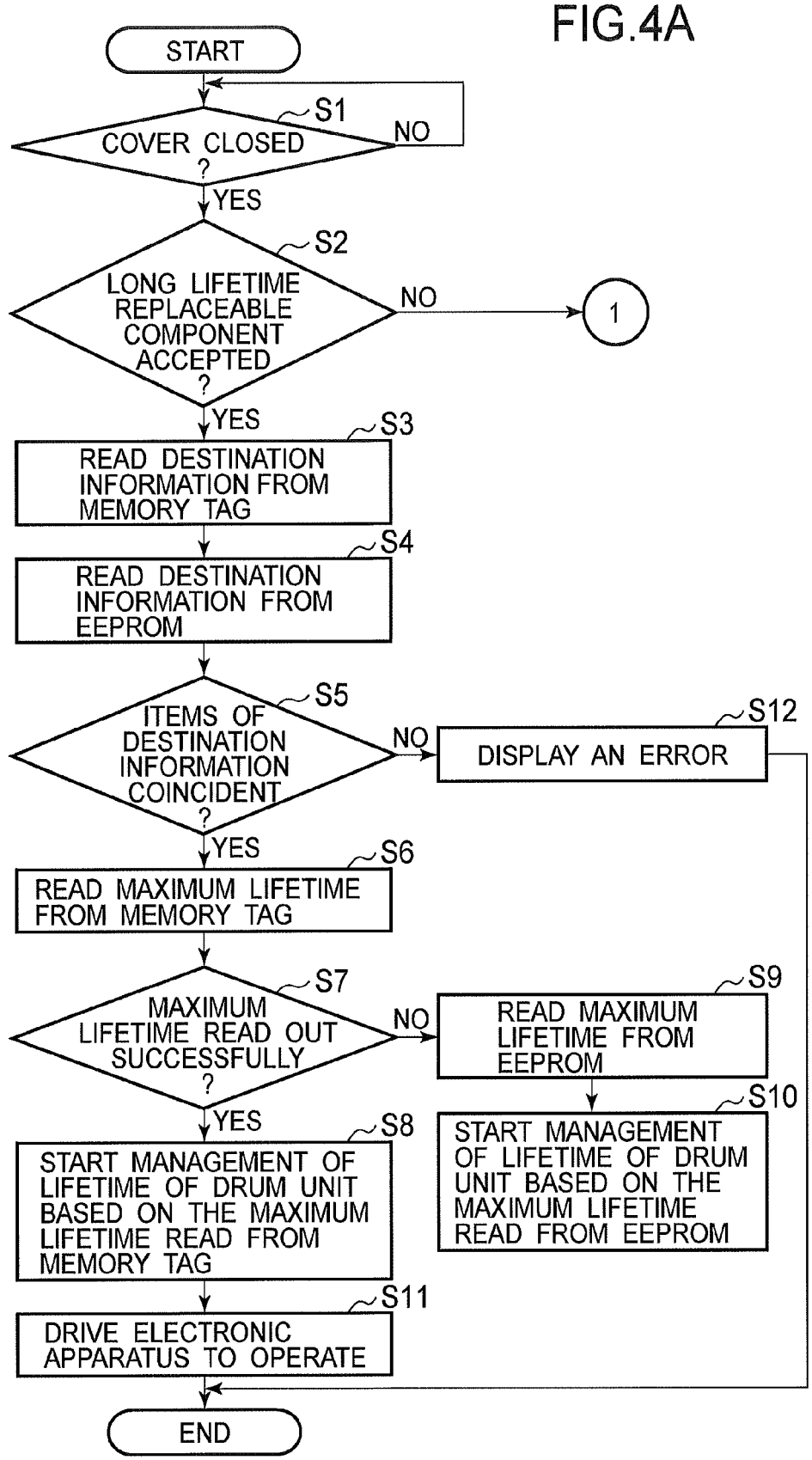
FIGS. 4A-4B are a flowchart illustrating the operation of the image forming apparatus from power-up to when the image forming apparatus becomes ready to perform a printing operation of a print job.
Figure 4B:
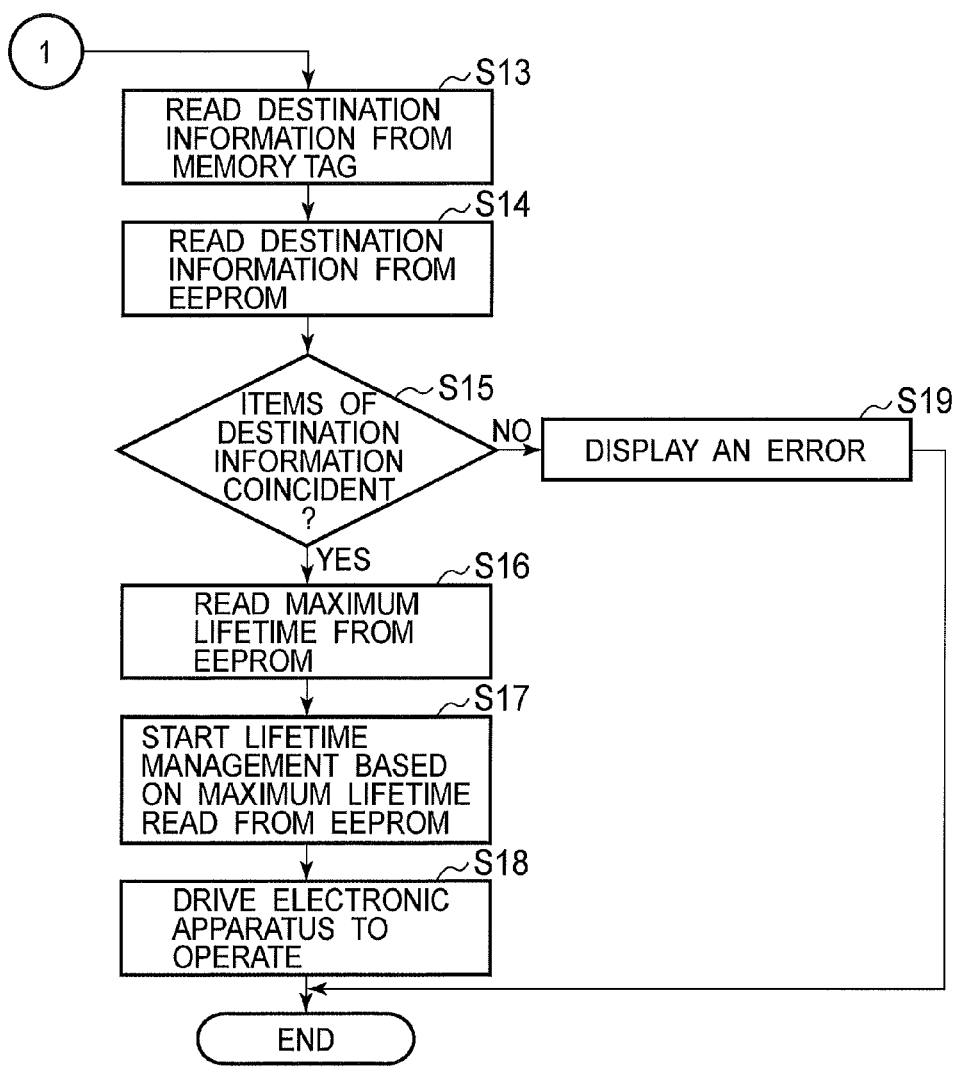

FIGS. 4A and 4B are a flowchart illustrating the operation of the image forming apparatus from power-up to when the image forming apparatus becomes ready to perform a printing operation of a print job.

Four drum units 7K, 7Y, 7M, and 7C for black, yellow, magenta, and cyan images, respectively, are attached to the image forming apparatus 1. Each of the drum units 7K, 7Y, 7M, and 7C may be substantially identical; for simplicity only the operation of the drum unit 7K for forming black images will be described, it being understood that the other drum units 7Y, 7M, and 7C may work in a similar fashion.

Upon power-up, the main controller 19 checks whether the cover (not shown) has been opened or closed (S1). Upon detection of closing of the cover, the program proceeds to S2.

At S2, the main controller 19 reads the type information from the EEPROM 20. If the content of the type information is "1," the program proceeds to S3; if the content of the type information is "0," the program proceeds to S13. At S3, the RF read/write controller 17 reads the destination information from the memory tag of one of the general purpose drum unit and the long lifetime drum unit that has been attached to the image forming apparatus, and then proceeds to S4. At S4, the main controller 19 reads the destination information from the EEPROM 20 and the proceeds to S5.

At S5, the main controller 19 compares the destination information read from the memory tag 10a and 10b with the destination information read from the EEPROM 20. If the two items of destination information are coincident (YES at S5), the program proceeds to S6; if they are not coincident (NO at S5), the main controller 19 causes the human interface 16 to display to the user that the two items of destination information are not coincident.

At S6, the main controller 19 reads the maximum lifetime from the memory tag of one of the general purpose drum unit and the long lifetime drum unit that has been attached to the image forming apparatus, and then the program proceeds to S7. At S7, if the main controller 19 reads the maximum lifetime successfully (YES at S7), then the program proceeds to S9. At S8, the main controller 19 starts the management of the lifetime of the drum unit, and the program proceeds to S11. At S9, the main controller 19 reads the maximum lifetime from the EEPROM 20, and the program proceeds to S10. At S10, the main controller 19 starts management of the lifetime of the drum unit based on the lifetime read from the EEPROM 20. At S11, if the lifetime determining section 21 determines that the value counted by the drum usage counting section 22 has not reached the reference, the printing operation of the image forming apparatus 1 is activated. This completes the initial operation of the image forming apparatus 1.

Since the image forming apparatus does not accept the long lifetime drum unit at S13, the main controller 19 reads the destination information from the memory tag of one of the general purpose drum unit and the long lifetime drum unit that has been attached to the image forming apparatus via the RF read/write controller 17, and then the program proceeds to S14. At S14, the main controller 19 reads the destination information from the EEPROM 20, and then the program proceeds to S15.

At S15, the main controller 19 compares the destination information read from the memory tag of one of the general purpose drum unit and the long lifetime drum unit that has been attached to the image forming apparatus with the destination information read from the EEPROM 20. If the two items of destination information are coincident (YES at S15), the program proceeds to S16; if NO (NO at S15), the program proceeds to S19. At S19, the main controller 19 causes the human interface 16 to display to the user that the two items of destination information are not coincident. The main controller 19 does not activate the printing operation of the image forming apparatus 1, terminating the initial operation.

At S16, the main controller 19 reads the maximum lifetime from the EEPROM 20, and then the program proceeds to S17. At S18, the main controller 19 starts the management of the lifetime of the drum unit based on the maximum lifetime read from the EEPROM 20, and then the program proceeds to S18. At S18, if the lifetime determining section 21 determines that the value counted by the drum usage counting section 22 has not reached the reference, the printing operation of the image forming apparatus 1 is activated. This completes the initial operation of the image forming apparatus 1.

When the user operates the human interface 16, the main controller 19 performs a corresponding operation such as formation of image on the recording medium 3.

The first embodiment provides the following effects.

The main controller 19 reads the type information from the EEPROM 20, and performs different initial operations depending on whether the type information is "1" or "0. This facilitates management of the drum unit according to conditions under which the image forming apparatus 1 is used.

The main controller 19 reads items of the destination information from the memory 10 and the EEOROM 20, and makes a decision to determine whether the items of destination information are coincident. The main controller then performs different initial operations depending on the determination. This facilitates management of the drum units according to destination.

The type of initial operation is selected depending on whether the main controller successfully reads the maximum lifetime from the memory tag 10a or 10b . This facilitates management of the drum units according to the type of drum unit: general purpose drum unit and long lifetime drum unit.

Second Embodiment

{Configuration}

FIG. 5 is a block diagram illustrating the outline of an image forming apparatus 1A according to a second embodiment. Elements similar to those of the first embodiment have been given the same reference numerals.

The image forming apparatus 1A includes a human interface 16, an RF read/write controller 17, antenna sections 18K, 18Y, 18M, and 18C, a print engine 23, and a main controller 19A. The main controller 19A differs from the main controller 19 in configuration and function.

The main controller 19A includes a lifetime determining section 21, a drum usage counting section 22, a drum rotation calculating section 24, and an EEPROM 20A. The second embodiment differs from the first embodiment in that the drum rotations calculating section 24 is employed and the EEPROM 20A holds a lifetime coefficient N in addition to all the items of information held in the EEPROM 20 of the first embodiment. The drum rotation calculating section 24 multiples the number of drum rotations held in the EEPROM 20A by the lifetime coefficient N, thereby outputting the result as a new lifetime. The remaining portion of the configuration is the same as that of the first embodiment.

FIG. 6A illustrates an example of information held in the EEPROM 20A when ordinary paper is used, and FIG. 6B illustrates an example of information held in the EEPROM 20A when special paper is used.

FIG. 6A shows the lifetime (e.g., 30,000 pages) and the lifetime coefficient N=1 for the ordinary paper while FIG. 6B shows the lifetime (e.g., 15,000 pages) and the lifetime coefficient N=0.5 for the special paper.

{Operation}

The image forming apparatus 1A may be used in a variety of ways. Some users may want to use a replaceable component that is capable of printing as many pages as possible or is usable for as long a time as possible, even at the cost of poor print quality. In order to meet such user's demands, a few types of drum units are available, e.g., general purpose drum unit 7a and long lifetime drum unit 7b, so that the user can select an appropriate drum unit according to the manner in which the replaceable component is used. The general purpose drum unit 7a has a memory tag 10a that does not store the lifetime information therein while the long lifetime drum unit 7b has a memory tag 10b that stores the maximum lifetime of, for example, 50,000 pages therein. The main controller 19A reads the maximum lifetime from the memory tag 10b and the EEPROM 20. When the general purpose drum unit 7a is attached to the image forming apparatus 1A, the lifetime of the drum unit is managed based on the maximum lifetime of 30,000 page held in the EEPROM 20. When the long lifetime drum unit 7b is attached to the image forming apparatus 1A, the lifetime is managed based on the maximum lifetime of 50,000 page held in the memory tag 10b.

For the users who use the special paper having a rough surface that tends to damage the drum surface, a relatively short lifetime of 15,000 pages is stored in the EEPROM 20A, thereby ensuring print quality.

If the long lifetime drum unit 7b is used, the maximum lifetime of 50,000 pages is read from the memory tag 10b of the long lifetime drum unit 7b, so that the lifetime is managed based on the maximum lifetime of 50,000 pages. This may cause damage to the photoconductive drum of the long lifetime drum unit 7b if printing is performed on the special paper with a rough surface. In order to address this problem, the EEPROM 20 holds the type information therein, type information "0" indicating the general purpose drum unit and type information "1" indicating the long lifetime drum unit, and the main controller 19 makes a decision to determine whether the image forming apparatus accepts the general purpose drum unit or the long lifetime drum unit. If the type information is "0," the image forming apparatus 1 accepts the general purpose drum unit only. If the type information is "1," the image forming apparatus 1 accept either of the general purpose drum unit and the long lifetime drum unit.

As described above, the general purpose drum unit 7a is acceptable to both the image forming apparatus 1A having a lifetime of 30,000 pages and the image forming apparatus 1A having a lifetime of 15,000 pages. However, a problem may arise is the following case.

Assume that a drum unit having a lifetime of 30,000 pages is attached to an image forming apparatus 1A having a lifetime of 30,000 pages, and has printed up to drum rotations of 15,000 pages. Thus, this drum unit still has a remaining lifetime of 15,000 pages. If this drum unit is attached to another image forming apparatus 1A having a lifetime of 15,000 pages, the image forming apparatus 1A will determine that the attached drum unit has reached the end of its usable lifetime. In order to avoid such a problem, the EEPROM 20 stores the lifetime coefficient N. For the image forming apparatus 1A that prints on the ordinary paper, the EEPROM 20 stores the maximum lifetime of 30,000 pages and the lifetime coefficient of N=1 as shown in FIG. 6A. For the image forming apparatus 1A that prints on the special paper, the EEPROM 20 stores the maximum lifetime of 15,000 pages and the lifetime coefficient of N=0.5 as shown in FIG. 6A.

The main controller 19A reads the number of drum rotations and the drum rotation calculating section 24 multiplies the number of drum rotations by the lifetime coefficient N. The resultant number of drum rotations is used to determine whether the maximum lifetime has been reached. For example, when an image forming apparatus 1A having a lifetime of 15000 pages is used, if the EEPROM 20A and memory tag 10a hold a current number of drum rotations of 5000 pages, the management of lifetime is performed based on the value of 5000×0.5=2500 pages which is calculated by the drum rotation calculating section 24. This calculated lifetime is a remaining lifetime of the drum unit.

Figure 7A:
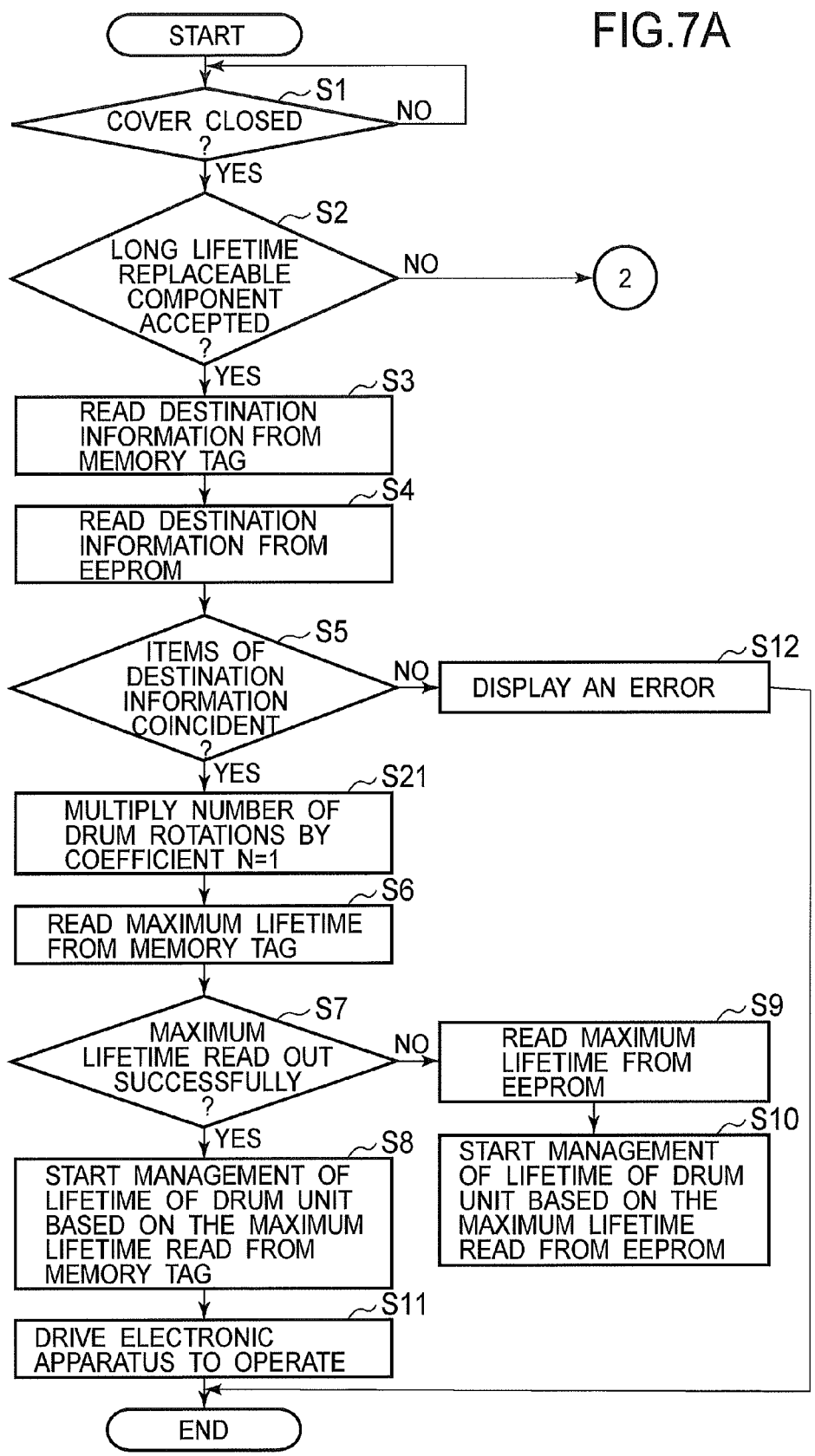
FIGS. 7A-7B are a flowchart illustrating the operation of the image forming apparatus according to the second embodiment, from power-up to when the image forming apparatus becomes ready to perform a printing operation of a print job.
Figure 7B:
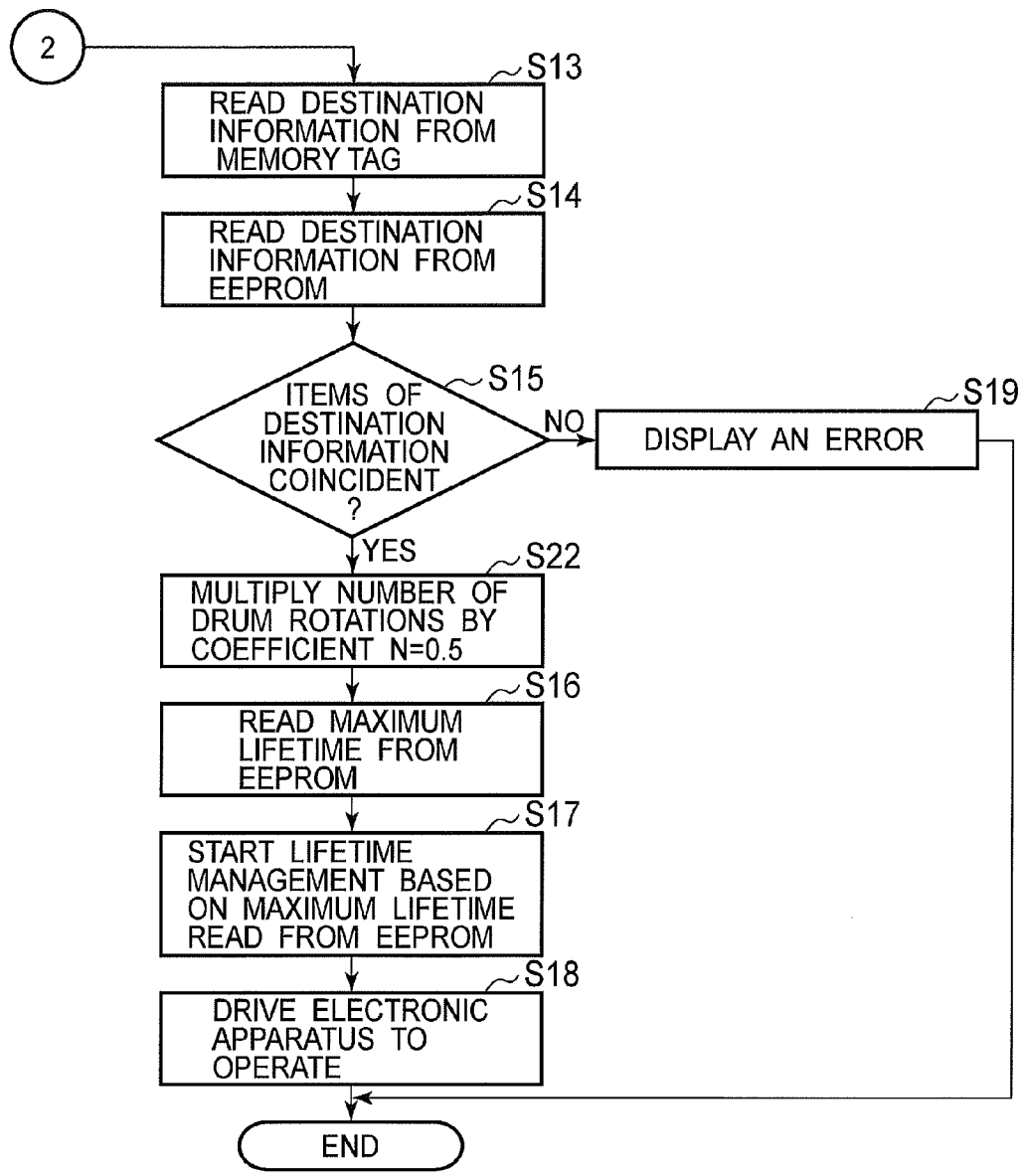

FIGS. 7A-7B are a flowchart illustrating the operation of the image forming apparatus from power-up to when the image forming apparatus becomes ready to perform a printing operation of a print job.

Steps similar to those shown in FIGS. 4A and 4B have been given the same step numbers.

Upon power-up, the main controller 19 checks whether the cover (not shown) has been opened or closed (S1). Steps S1-S5 are the same as those in the first embodiment. At S5, the main controller 19A reads the destination information from the memory tag of one of the general purpose drum unit and the long lifetime drum unit that has been attached to the image forming apparatus. and the destination information from the EEPROM 20A, and compares the two items of destination information. If the two items of destination information are coincident (YES at S5), the program proceeds to S21; if not (NO at S5), the program proceeds to S12 where the main controller 19A causes the human interface 16 to display a message that the two items of destination information are not coincident.

At S21, the main controller 19A reads the number of drum rotations from the EEPROM 20 and the lifetime coefficient N, and the drum rotation calculating section 24 multiplies the number of drum rotations by the lifetime coefficient N before the program proceeds to S6. Steps S6-S11 are the same as those in the first embodiment. At S11, if the lifetime determining section 21 determines that the value counted by the drum usage counting section 22 has not reached the reference value, the main controller 19A activates a printing operation of the image forming apparatus 1A.

At S2, the main controller 19A reads the type information from the EEPROM 20A. If the type information is "1, " then the program proceeds to S3. If the type information is "0," then the program proceeds to S13. Steps S13-S15 are the same as those in the first embodiment.

At S15, the main controller 19A compares the destination information read from the memory tag 10a or memory tag 10b with the destination information read from the EEPROM 20A. If the two items of destination are coincident (YES at S15), the program proceeds to S22; if not (NO at S15), the program proceeds to S19 where the main controller 19A causes the human interface 16 to display an error message that the destination is improper. The image forming apparatus 1A does not activate a printing operation.

At S22, the main controller 19A reads the number of drum rotations from the EEPROM 20, and the drum rotation calculating section 24 multiplies the number of drum rotations by the lifetime coefficient N before the program proceeds to S16. Steps S16-S18 are the same as those in the first embodiment. At S17, the main controller 19A starts to manage the lifetime using the lifetime calculated by the drum rotation calculating section 24 as a reference value, and the program proceeds to S18. At S18, if the lifetime determining section 21 determines that the value counted by the drum usage counting section 22 has not reached the reference, the main controller 19A activates a printing operation of the image forming apparatus 1A.

Subsequently, the main controller 19A performs predetermined operations including image formation on the recording medium 3 in accordance with the commands from the user via the human interface 16.

The second embodiment provides the following effects.

The image forming apparatus 1A includes the main controller 19a that includes the drum rotation calculating section 24, and the EEPROM 20A that holds the lifetime coefficient N. The values of the lifetime in the memory tags 10a and 10b and the EEPROM 20A are updated based on the calculated values of lifetime. This facilitates management of the drum unit even when a drum unit is detached from one image forming apparatus 1A to another image forming apparatus.

{Modification}

A variety of modifications may be made in addition to the first and second embodiments. The following are exemplary modifications.

The electronic apparatus according to the first and second embodiments have been described in terms of the image forming apparatuses 1 and 1A. However, the electronic apparatus is not limited to the image forming apparatuses 1 and 1A. The invention may be applicable as long as an electronic apparatus employs replaceable components having different destinations, lifetimes and conditions under which the electronic apparatus is used.

The replaceable components of the first and second embodiment have been described in terms of drum units 7K, 7Y, 7M, and 7C. The replaceable components are not limited to the drum unit but may be any other apparatus as long as a plurality of replaceable components with different lifetimes are employed. Such apparatus include a color/monochrome copying machine, a facsimile machine, a multi peripheral printer (MFP), and the like.

The first and second embodiments have been described as follows: The RF read/write controller 17 reads information from and writes information into the memory tag via the antenna sections 18K, 18Y, 18M, and 18C. However, the information does not need to be communicated by wireless communication. For example, the RF read/write controller 17 may be connected to the memory chips of the memory tag 10a and 10b via connectors, and information may be read from and written into the memory chips directly.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. An electronic apparatus comprising:
a body;
a replaceable component detachably attached to the body, and including a first memory that stores information about the replaceable component;
a second memory that is disposed within the body and stores first lifetime information therein;
a reading section configured to read the information about the replaceable component from the first memory; and
a controller configured to manage a lifetime of the replaceable component,
wherein if the information about the replaceable component that is successfully read by the reading section includes second lifetime information that designates a specified lifetime for the replaceable component, the controller manages the lifetime of the replaceable component in accordance with the second lifetime information, and
wherein if the information about the replaceable part that is successfully read by the reading section does not include the second lifetime information, the controller manages the lifetime of the replaceable component in accordance with the first lifetime information.

2. The electronic apparatus according to claim 1, wherein the first memory further stores destination information indicative of a destination to which the replaceable component should be shipped, wherein the reading section reads the destination information, and wherein the controller controls the electronic apparatus so that the electronic apparatus operates in accordance with the destination information read by the reading section.

3. The electronic apparatus according to claim 2, wherein the electronic apparatus is an electrophotographic image forming apparatus; and
wherein the replaceable component is a drum unit of the electrophotographic image forming apparatus.

4. The electronic apparatus according to claim 2, further comprising a calculating section configured to calculate a remaining life of the replaceable component based on a lifetime coefficient and one of the first lifetime information and the second lifetime information when the replaceable component has been attached to the body, and wherein the controller controls the electronic apparatus in accordance with the calculated remaining life.

5. The electronic apparatus according to claim 1, wherein the electronic apparatus is an electrophotographic image forming apparatus; and
wherein the replaceable component is a drum unit of the electrophotographic image forming apparatus.

6. The electronic apparatus according to claim 5, wherein the controller writes a cumulative number of rotations of a photoconductive drum, and the first lifetime information represents a first number of rotations of the photoconductive drum and the second lifetime information represents a second number of rotations of the photoelectric drum.

7. The electronic apparatus according to claim 6, wherein the controller writes the cumulative number of rotations of the photoconductive drum into the first memory and the second memory during a printing operation of the electrophotographic image forming apparatus.

8. The electronic apparatus according to claim 1, wherein the second memory further stores a lifetime coefficient therein;
wherein the electronic apparatus further includes a calculating section configured to calculate a remaining life of the replaceable component when the replaceable component has been attached to the body, the calculation being made based on the first lifetime information and the lifetime coefficient; and
wherein the controller controls the electronic apparatus so that the electronic apparatus operates based on the calculated remaining life.

9. The electronic apparatus according to claim 8, wherein the electronic apparatus is an electrophotographic image forming apparatus; and
wherein the replaceable component is a drum unit of the electrophotographic image forming apparatus.

10. The electronic apparatus according to claim 1 further comprising a display unit;
wherein the first memory further stores first destination information indicative of a destination to which the electronic apparatus should be shipped;
wherein the controller compares the first destination information read from the first memory by the reading section with second destination information stored in the second memory; and
wherein if the first destination information and the second destination do not coincide, the controller drives the display unit to display an error message.

* * * * *